US011506252B2

(12) United States Patent
Asshoff et al.

(10) Patent No.: US 11,506,252 B2
(45) Date of Patent: Nov. 22, 2022

(54) ADJUSTABLE DAMPING VALVE DEVICE

(71) Applicant: ZF Friedrichshafen AG, Friedrichshafen (DE)

(72) Inventors: Thorsten Asshoff, Breitenguessbach (DE); Achim Sauerbrey, Schweinfurt (DE); Robert Pradel, Roethlein (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 891 days.

(21) Appl. No.: 16/373,697

(22) Filed: Apr. 3, 2019

(65) Prior Publication Data
US 2019/0309818 A1    Oct. 10, 2019

(30) Foreign Application Priority Data
Apr. 4, 2018  (DE) ...................... 10 2018 205 054.6

(51) Int. Cl.
| | | |
|---|---|---|
| *H01F 27/28* | (2006.01) | |
| *F16K 31/06* | (2006.01) | |
| *F16F 9/46* | (2006.01) | |
| *H01F 7/128* | (2006.01) | |

(52) U.S. Cl.
CPC .......... *F16F 9/461* (2013.01); *F16K 31/0655* (2013.01); *F16K 31/0675* (2013.01); *H01F 7/128* (2013.01); *H01F 27/28* (2013.01)

(58) Field of Classification Search
CPC ............. F16K 31/0655; F16K 31/0675; F16K 31/0686; H01F 7/081; H01F 7/127; H01F 7/128; H01F 7/1607; H01F 27/28; F16F 9/34; F16F 9/461; F16F 9/463; F16F 9/464
See application file for complete search history.

(56) References Cited

U.S. PATENT DOCUMENTS

| | | | | |
|---|---|---|---|---|
| 5,085,402 A | * | 2/1992 | O'Dell | ................ F16K 31/0651 251/129.21 |
| 5,139,227 A | * | 8/1992 | Sumida | .................. F02M 3/075 251/129.08 |
| 5,860,632 A | * | 1/1999 | Buth | ..................... H01F 41/005 29/605 |
| 6,374,814 B1 | * | 4/2002 | Cook | .................. F16K 37/0041 123/568.21 |
| 6,588,093 B1 | * | 7/2003 | Emmerich | .......... H01F 41/0233 29/609 |
| 7,472,883 B2 | * | 1/2009 | Murao | .................. F16K 31/061 335/299 |

(Continued)

FOREIGN PATENT DOCUMENTS

| | | |
|---|---|---|
| DE | 102009059808 | 6/2011 |
| DE | 102014215566 | 1/2016 |
| WO | WO8905929 | 12/1987 |

*Primary Examiner* — Matthew W Jellett
(74) *Attorney, Agent, or Firm* — Cozen O'Connor

(57) ABSTRACT

An adjustable damping valve device includes a coil carrier with a coil which is wound on an inner sleeve and which has two wire ends which protrude over a winding body. A back iron having a passage for a power supply line of the coil is placed on the coil carrier. The wire ends of the coil are co-located adjacent to one another in an outlet area of the coil carrier, and the back iron has a radial slot which extends from the outer edge of the back iron to the passage and has a width which corresponds at least to the width of the outlet area.

10 Claims, 4 Drawing Sheets

(56) References Cited

U.S. PATENT DOCUMENTS

| | | | | |
|---|---|---|---|---|
| 7,768,368 B2* | 8/2010 | Muffler | ............... | H01R 4/26 |
| | | | | 335/282 |
| 8,264,312 B2* | 9/2012 | Hamaoka | ............ | F16K 31/0675 |
| | | | | 335/278 |
| 8,477,002 B2* | 7/2013 | Hoppe | ............... | F01L 1/344 |
| | | | | 335/278 |
| 9,184,524 B2* | 11/2015 | Tomita | ............... | F16K 31/0675 |
| 9,222,591 B2* | 12/2015 | Sauerbrey | ............... | F16F 9/464 |
| 9,746,097 B1* | 8/2017 | Ishii | ............... | H01F 5/02 |
| 10,153,076 B2* | 12/2018 | Watanabe | ............... | H01F 5/06 |

* cited by examiner

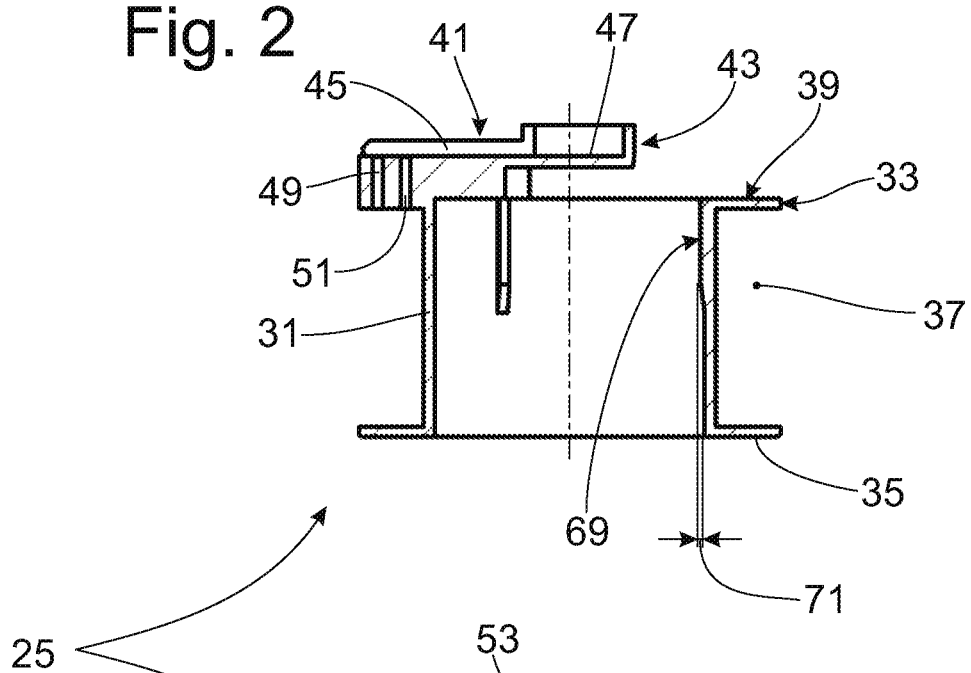
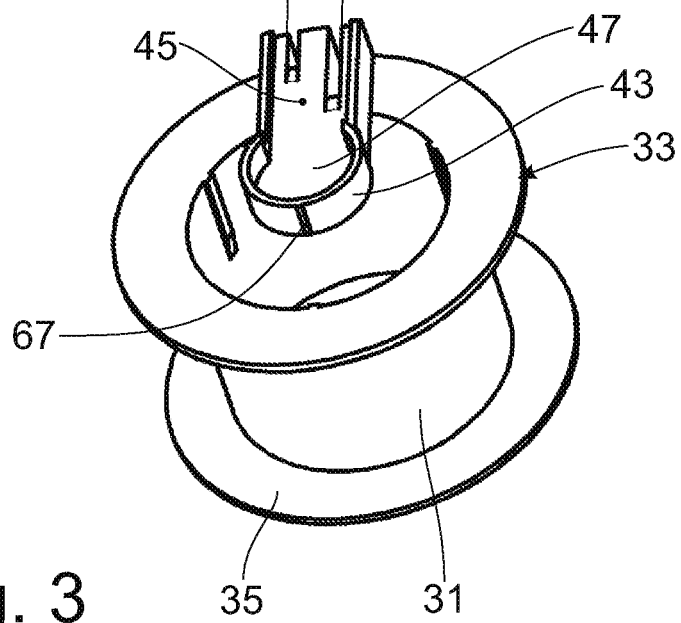

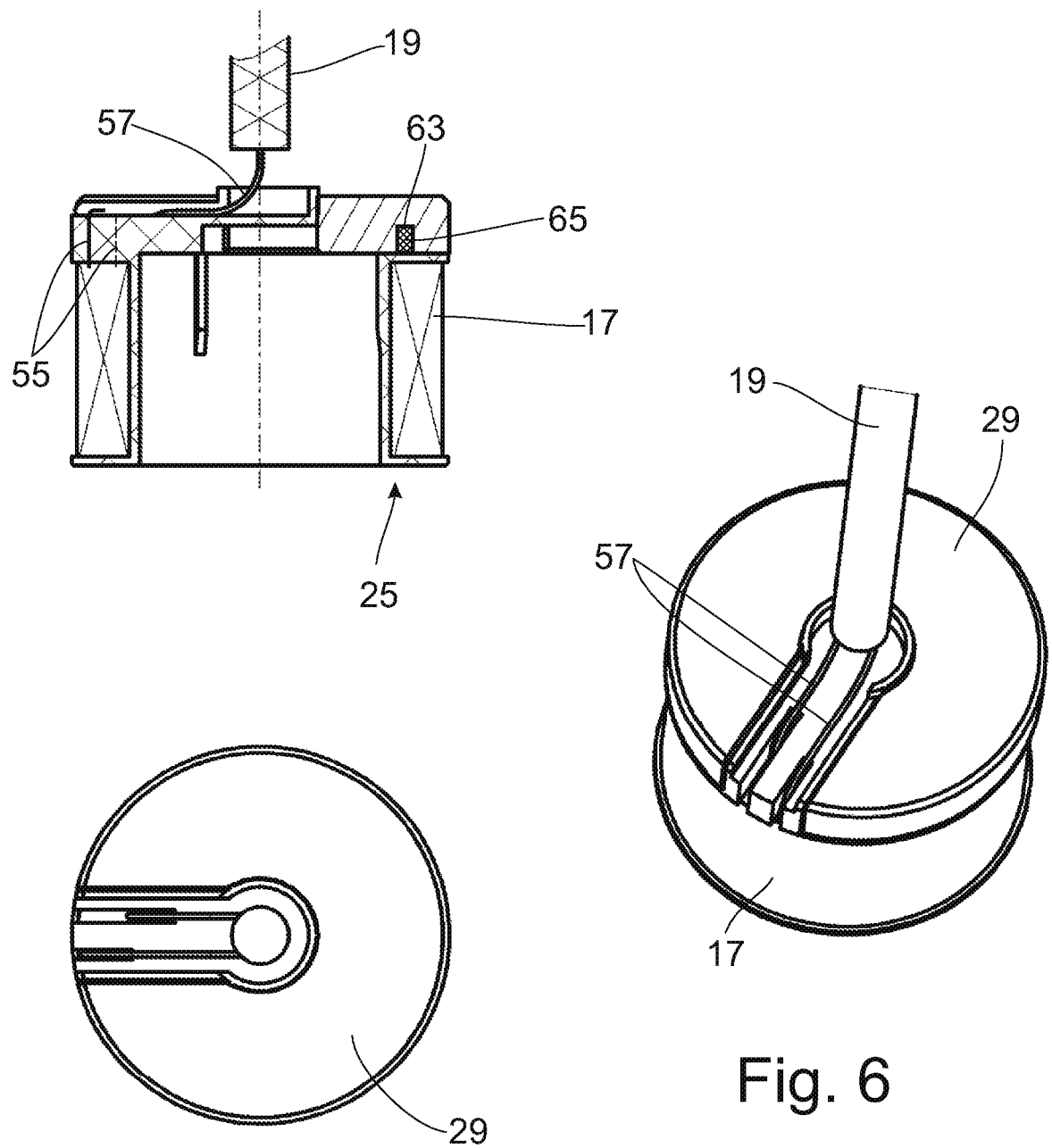

ADJUSTABLE DAMPING VALVE DEVICE

BACKGROUND OF THE INVENTION

1. Field of the Invention

The present invention is directed to an adjustable damping valve device having a coil carrier with a magnetic coil wound on an inner sleeve and a back iron having a passage for a power supply line of the magnetic coil placed on the coil carrier.

2. Background of the Invention

FIGS. 2 to 11 of DE 10 2009 059 808 A1, the entire content of which is incorporated herein by reference, describe details of a coil housing and of the back iron cooperating therewith. As is shown in particular in FIGS. 4 to 7, a coil housing has an inner sleeve on which the coil is wound. The two wire ends of the wound coil penetrate an upper edge of the coil housing and run radially inward through a connection bridge to a cable connection. The connection bridge forms a raised yoke which is received by a back iron which is placed on an upper side of the coil housing. There is no bonding connection between the back iron and the coil housing, for example, via a potting compound. Instead, the back iron has a groove which extends along the entire center axis. The groove divides the back iron into two identical circle segments which are held together by a cover. The inside of the cover forms a groove base in relation to the groove.

In the endeavor to minimize the constructional length of an adjustable damping valve device, special consideration must be accorded to the coil housing because a comparatively large installation space must be made available for it. It is thus an object of the present invention to optimize the constructional length of an adjustable damping valve device.

SUMMARY OF THE INVENTION

This object is met in that the wire ends of the coil are co-located adjacent to one another in an outlet area of the coil carrier, and the back iron has a radial slot which extends from the outer edge of the back iron to the passage and has a width which corresponds at least to the width of the outlet area.

The advantage consists in that the installation space for the yoke used heretofore is no longer needed. Consequently, the headroom for the cover area at the back iron is also dispensed with. The C-shape of the back iron can be produced simply. In theory, the C-shape of the back iron leads to a worsening of the magnetic flux of the coil. However, it has been shown that there is no noticeable loss in lift force as a result of the axial distance between the magnetic field area at the transition between the back iron and coil and a valve armature which is to be moved.

The back iron is advantageously constructed as a planar disk which can be produced simply and with sufficient precision, for example, in a sintering process or stamping process.

The damping valve device can be kept particularly variable when the back iron is constructed as a stack of laminations.

According to an advantageous embodiment, the coil carrier has a toroidal support surface for the back iron. With the toroidal support surface, an armature guide can engage in the installation space bounded by the toroidal support surface so that a compact constructional form can be achieved.

Further, it is provided that the coil carrier has a centering profile for the back iron. An eccentricity of the back iron relative to the coil carrier for the armature guide can be minimized via the centering profile. The constructional unit comprising back iron and coil carrier is inserted into a valve housing which serves as conductor for the magnetic flux. As a result of the centering, jamming can be prevented (joining for interference fit is ensured in this way in particular) and a uniform magnetic flux transition can be achieved.

The back iron can basically be mounted as an appended part because the coil carrier is fixed together with the back iron inside of the valve housing. Therefore, fixing would not be absolutely necessary. For the assembly phase in which the back iron is connected to the coil carrier but is not yet fixed in the valve housing, it can be provided that the back iron has at least two locating holes in direction of the coil, the coil carrier being fabricated from a plastic and a retaining connection to the locating holes being closed during the process of producing the coil carrier. The constructional unit comprising back iron and coil carrier can be handled easily without the parts coming loose from one another.

In a further advantageous configuration, the coil carrier has a guide for the power supply line extending from the toroidal support surface as a radially extending land. The guide facilitates the contact between the wound coil and the power supply line. The guide has a width which can be inserted into the radial slot of the back iron.

According to a further advantageous embodiment, the inner sleeve of the coil carrier has a centering profile for an armature guide inside the inner sleeve. An air gap between the inner sleeve and the armature guide is bridged via the centering profile.

For the purpose of a simple assembly, the guide has an axial end stop for the power supply line.

For a very simple construction of the coil carrier, the centering profile for the back iron is formed at the guide for the power supply line. The centering profile may be formed by simple projecting lands.

In order that all of the relevant structural component parts for the functioning of the damping valve device are optimally positioned relative to one another, the centering profile for the back iron and the centering profile for the armature guide have an identical basic shape and an identical angular orientation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention will be described in more detail referring to the following description of the figures in which:

FIG. 2 is a cross-sectional view of the coil carrier of the present invention as individual part;

FIG. 3 is a perspective view of the coil carrier of the present invention;

FIG. 4 is a cross-sectional view of the coil carrier with magnetic coil and back iron;

FIG. 5 is a top view of the back iron of the present invention;

FIG. 6 is a perspective view of the magnetic coil and back iron of the present invention.

DETAILED DESCRIPTION OF THE
PRESENTLY PREFERRED EMBODIMENTS

Figure 1:
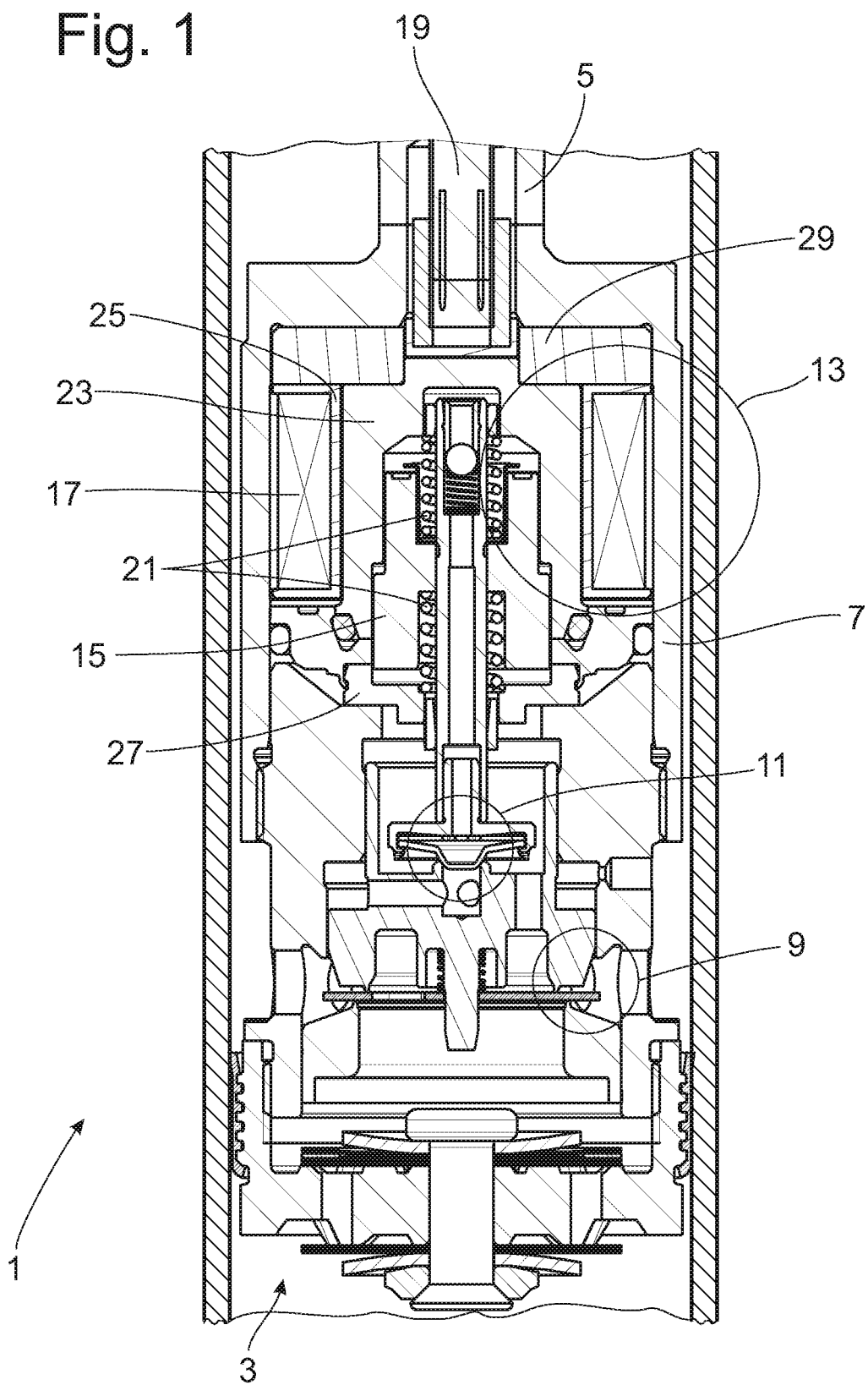
FIG. 1 is a cross-sectional view of a vibration damper with a damping valve device of the present invention.

FIG. 1 shows a section from a vibration damper 1 with an adjustable damping valve device 3. A main stage valve 9 whose damping behavior is controllable via a pilot stage valve 11 is arranged in a valve housing 7 which is fastened, for example, to a piston rod 5. The pilot stage valve 11 is actuated via an actuator 13 which comprises a valve armature 15 and a magnetic coil 17. Depending on an energizing of the magnetic coil 17 via a power supply line 19, the valve armature 15 executes an axial lifting movement via which, in conjunction with a spring arrangement 21, a closing force is adjusted on the pilot stage valve 11.

The valve armature 15 slides in an armature guide 23 which is in turn aligned with a coil carrier 25. For the movement of the valve armature 15, the magnetic flux of the magnetic coil 17 penetrates the armature guide 23, valve armature 15, a pole disk 27, valve housing 7 and a back iron 29 which is arranged on coil carrier 25 and which is in turn radially coextensive with the armature guide 23.

FIGS. 2 and 3 show the coil carrier 25 of FIG. 1 as an individual part. Coil carrier 25 comprises an inner sleeve 31 with two flange-like edges 33; 35 which are axially spaced apart and face radially outward. Edges 33; 35 and inner sleeve 31 define a coil window 37 for the wound magnetic coil 17. The upper edge 33 of coil carrier 25 forms a toroidal support surface 39 for back iron 29. The lower edge 35 serves as a fixating surface of coil carrier 25 inside valve housing 7.

Coil carrier 25 has a guide 41 for power supply line 19 which extends as radially extending land proceeding from the toroidal support surface 39. Guide 41 further includes an annular portion 43 for power supply line 19 and a channel area 45 which is angled with respect to the latter for the connection between stranded wires of power supply line 19 and the ends of the coil which is wound from a wire. Guide 41 has an axial end stop 47 for the power supply line 19.

It will be apparent from the two FIGS. 2 and 3 when viewed in conjunction that upper edge 33 has two through-openings 49; 51 for the two wire ends of the wound magnetic coil 17 (FIG. 4). Through-openings 49; 51 are co-located and are coextensive with channel area 45 of guide 41. The space between the two through-openings 49; 51 in circumferential direction forms an outlet area 53. The width of guide 41 is at least as large as the outlet width 53 of the arrangement of through-openings 49; 51.

Figure 7:
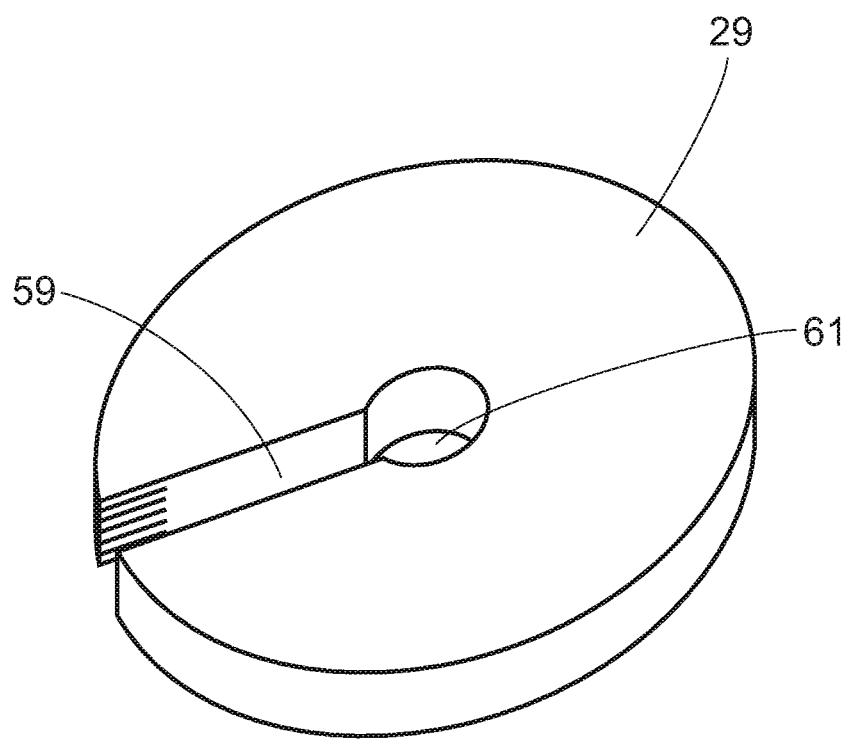
FIG. 7 is a perspective view of the back iron as individual part.

Coil carrier 25 is shown in FIGS. 4 to 6 with a wound magnetic coil 17. The connection between wire ends of magnetic coil 17 and stranded wires 57 of power supply line 19 is discernable. As has already been described, wire ends 55 of the coil are co-located adjacent to one another in outlet area 53 of coil carrier 25, and back iron 29 has a radial slot 59 (FIG. 7) which extends from the outer edge of back iron 29 to a passage 61 and has a width which corresponds at least to the width of outlet area 53 (see FIG. 5). It will be seen from the top view in FIG. 5 that back iron 29 is constructed as a planar disk. In principle, back iron 29 could also be constructed as a stack of laminations (FIG. 7). It can further be seen from FIG. 4 that back iron 29 is supported on the flange-like upper edge 33.

It is advantageous for the assembly of damping valve device 3 when back iron 29 is connected to coil carrier 25 for the assembly process. An incorrect assembly can be prevented in this way. One possibility for a connection can be achieved in that back iron 29 has at least two locating holes 63 (FIG. 4) in direction of magnetic coil 17, coil carrier 25 being produced from a plastic, and a retaining connection to the locating holes being closed during the process of producing the coil carrier proceeding from upper edge 33 via a fastening pin 65.

Alternatively or in addition, coil carrier 25 can have a centering profile 67 for back iron 29 (FIG. 3). An interference fit which ensures that back iron 29 is held together with coil carrier 25 as required can be realized via centering profile 67 or else via the combination of radial slot 59 in back iron 29 with the radial land or guide 41. Centering profile 67 is preferably formed at the annular portion 43 for power supply line 19.

In addition to the arrangement of back iron 29, coil carrier 25 is also optimized in terms of armature guide 23. For this reason, inner sleeve 31 has a centering profile 69 for an armature guide 23 inside the inner sleeve. Centering profile 69 provides for a slight segment-like air gap 71 between armature guide 23 and coil carrier 25. Air gap 71 serves to compensate for the increase in volume of coil carrier 25 when magnetic coil 17 is heated.

Optionally, centering profile 67 for back iron 29 and centering profile 69 for armature guide 23 have an identical basic form and an identical angular orientation. An optimal alignment of back iron 29 relative to armature guide 23 is achieved in this way.

During production, back iron 29 can optionally be inserted into the injection mold for coil carrier 25 which, as has already been mentioned, is preferably made of plastic. The mechanical connection between back iron 29 and coil carrier 25 is produced via the injection process. Subsequently, wire is wound around coil carrier 25, and wire ends 55 are bent through edge 33 in direction of guide 41. In a next step, power supply line 19 is fitted, and the bent stranded wires 57 run in the radial guide 41. This constructional unit is inserted into valve housing 7 of damping valve device 3, and power supply line 19 is threaded into the hollow piston rod 5. The further structural component parts of damping valve device 3 are then fitted.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. An adjustable damping valve device comprising:
a valve housing;
a hollow piston rod fastened to the valve housing;
a power supply line arranged inside the hollow piston rod;
a coil carrier comprising an inner sleeve and an outlet area having a width;
a magnetic coil wound on the inner sleeve and having two wire ends; and
a back iron having a passage for the power supply line of the magnetic coil placed on the coil carrier; wherein wire ends of the magnetic coil being co-located adjacent to one another in the outlet area; and the back iron having a radial slot extending from an outer edge of the back iron to the passage and having a width corresponding at least to the width of the outlet area,
wherein the coil carrier has a guide for the power supply line which extends as a radially extending land proceeding from a toroidal support surface, the guide further including an annular portion for the power supply line and a channel area which is angled with respect to the power supply line for connection between stranded wires of the power supply line and the ends of the coil which is wound from a wire, the annular portion being configured to engage the piston rod, and
wherein a connection between the wire ends of the coil and the stranded wires of the power supply line is made within the guide.

2. The adjustable damping valve device according to claim 1, wherein the back iron is constructed as a planar disk.

3. The adjustable damping valve device according to claim 2, wherein the back iron is constructed as a stack of laminations.

4. The adjustable damping valve device according to claim 1, wherein the coil carrier comprises a toroidal support surface for the back iron.

5. The adjustable damping valve device according to claim 1, wherein the coil carrier comprises a centering profile for the back iron.

6. The adjustable damping valve device according to claim 4, wherein the back iron comprises at least two locating holes in direction of the magnetic coil, wherein the coil carrier is produced from a plastic and a retaining connection to the locating holes is closed during the process of producing the coil carrier.

7. The adjustable damping valve device according to claim 4, wherein the coil carrier comprises a guide for the power supply line extending from the toroidal support surface as a radially extending land.

8. The adjustable damping valve device according to claim 1, wherein the inner sleeve of the coil carrier comprises a centering profile for an armature guide inside the inner sleeve.

9. The adjustable damping valve device according to claim 7, wherein the guide comprises an axial end stop for the power supply line.

10. The adjustable damping valve device according to claim 5, wherein the centering profile for the back iron is formed at the guide for the power supply line.

* * * * *